United States Patent
Morisaku et al.

(10) Patent No.: US 10,135,042 B2
(45) Date of Patent: Nov. 20, 2018

(54) BATTERY MODULE UNIT (71) Applicant: KABUSHIKI KAISHA TOYOTA JIDOSHOKKI, Aichi (JP)

(72) Inventors: Naoto Morisaku, Aichi (JP); Hiromi Ueda, Aichi (JP); Takayuki Kato, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 79 days.

(21) Appl. No.: 15/100,686

(22) PCT Filed: Nov. 7, 2014

(86) PCT No.: PCT/JP2014/079610
§ 371 (c)(1),
(2) Date: Jun. 1, 2016

(87) PCT Pub. No.: WO2015/083492
PCT Pub. Date: Jun. 11, 2015

(65) Prior Publication Data
US 2016/0301043 A1   Oct. 13, 2016

(30) Foreign Application Priority Data
Dec. 4, 2013   (JP) ................................. 2013-250892

(51) Int. Cl.
*H01M 2/10*   (2006.01)
*H01M 10/647*   (2014.01)
*H01M 10/6555*   (2014.01)
*H01M 10/613*   (2014.01)

(52) U.S. Cl.
CPC ....... *H01M 2/1016* (2013.01); *H01M 2/1077* (2013.01); *H01M 10/613* (2015.04); *H01M 10/647* (2015.04); *H01M 10/6555* (2015.04)

(58) Field of Classification Search
CPC .......................... H01M 2/1016; H01M 2/1077
USPC .......................................................... 429/211
See application file for complete search history.

(56) References Cited

U.S. PATENT DOCUMENTS

2013/0071740 A1 * 3/2013 Takamura ................ C09J 7/385
429/211

FOREIGN PATENT DOCUMENTS

| JP | 2006-080045 | * | 3/2006 | ............. H01M 2/10 |
| JP | 2006-80045 | | 3/2006 | |

OTHER PUBLICATIONS

International Search Report for PCT/JP2014/079610, dated Feb. 10, 2015, along with English-language translation thereof.

(Continued)

*Primary Examiner* — Osei K Amponsah
(74) *Attorney, Agent, or Firm* — Greenblum & Bernstein, P.L.C.

(57) ABSTRACT

A battery module unit for a power supply device is designed so that the value of the adhesive strength between an end plate and an outermost tape and the value of the adhesive strength between a battery module and the outermost tape are greater than or equal to the minimum required strength for holding the battery module and around the minimum required strength. As a result, the battery module does not fall off in a normally held state and the end plate can be easily peeled off from the battery module at the time of reworking.

8 Claims, 6 Drawing Sheets

(56) References Cited

OTHER PUBLICATIONS

Translation of the Written Opinion of the International Searching Authority for for PCT/JP2014/079610, dated Feb. 10, 2015.
International Preliminary Report on Patentability for PCT/JP2014/079610, dated Jun. 7, 2016.

* cited by examiner

BATTERY MODULE UNIT

TECHNICAL FIELD

The present invention relates to a battery module unit.

BACKGROUND ART

Conventionally, a battery module, which has a plurality of battery cells in order to ensure a high-voltage and high-output power source, has been known. As this type of battery module, a configuration of a plurality of stacked battery cells is known, and the battery module is held by a pair of end plates from both end sides in a stacking direction of the battery units. In addition, there is a known technology for attempting insulation, heat release, and prevention of a position gap of the battery cells by disposing a double-sided adhesive tape between adjacent battery cells.

SUMMARY OF INVENTION

Technical Problem

The above-described battery module, in which the double-sided adhesive tape is disposed between the battery cells, attempts to prevent the battery module from falling off by disposing double-sided adhesive tapes between the end plates positioned at both ends and battery cells positioned adjacent to the end plates.

However, during an operation of replacing a component of the battery module or rearranging a position of the battery module (hereinafter referred to as reworking), the end plates need to be removed from the battery module. Further, there may be difficulty in removing the end plates from the battery module due to adhesive property of a double-sided adhesive tape disposed between an end plate and a battery cell positioned adjacent to the end plate. In this case, workability in reworking is degraded.

In other words, an object of various aspects of the invention is to provide a battery module unit that enhances workability in reworking while preventing a battery module from falling off.

Solution to Problem

A battery module unit according to an aspect of the invention comprises a battery module having a plurality of stacked battery units each including a battery cell, a pair of end plates holding the battery module from both end sides in a stacking direction of the battery units, and a first double-sided adhesive tape disposed between the battery module and each of the pair of end plates, wherein an adhesive strength between the first double-sided adhesive tape and the end plates and an adhesive strength between the first double-sided adhesive tape and the battery module are greater than or equal to half an inertial force applied to the battery module, and a value of the adhesive strength between the first double-sided adhesive tape and the end plates is different from a value of the adhesive strength between the first double-sided adhesive tape and the battery module.

In the battery module unit, the adhesive strength between the first double-sided adhesive tape and the end plates is designed to be greater than or equal to a minimum required strength for holding the battery module, and thus the battery module does not fall off in a normally held state. In addition, the first double-sided adhesive tape is designed such that the value of the adhesive strength between the first double-sided adhesive tape and the end plates is different from a value of the adhesive strength between the first double-sided adhesive tape and the battery module. Thus, one of the battery module and the end plates having a smaller adhesive strength value can be easily peeled off from the first double-sided adhesive tape at the time of reworking, and workability in reworking is improved.

A battery module unit according to an aspect of the invention comprises a battery module having a plurality of stacked battery units each including a having battery cells, a pair of end plates holding the battery module from both end sides in a stacking direction of the battery units, and a first double-sided adhesive tape disposed between the battery module and each of the pair of end plates, wherein an adhesive strength between the first double-sided adhesive tape and the end plates and an adhesive strength between the first double-sided adhesive tape and the battery module are greater than or equal to half an inertial force applied to the battery module and around half the inertial force.

In the battery module unit, the adhesive strength of the first double-sided adhesive tape with respect to the end plates is designed to be greater than or equal to a minimum required strength for holding the battery module and around the minimum required strength. For this reason, the battery module does not fall off in a normally held state, and the end plates can be easily peeled off from the battery module at the time of reworking.

In addition, the adhesive strength of the first double-sided adhesive tape with respect to the end plates may be different from an adhesive strength of the first double-sided adhesive tape with respect to the battery units.

In addition, the battery module unit may further have a second double-sided adhesive tape disposed between respective adjacent battery units, wherein the second double-sided adhesive tape and the first double-sided adhesive tape may be configured using the same type of tape having the same adhesive property.

Advantageous Effects of Invention

According to various aspects of the invention, a battery module unit that enhances workability in reworking while preventing a battery module from falling off is provided.

DESCRIPTION OF EMBODIMENTS

Hereinafter, embodiments of the invention will be described in detail with reference to accompanying drawings. The same reference numeral will be applied to the same or equivalent component. When description is repeated, the repeated description will be omitted.

First, a description will be given of a battery module unit 1 of a power supply device with reference to FIG. 1, FIG. 2, and FIG. 3.

Figure 1:
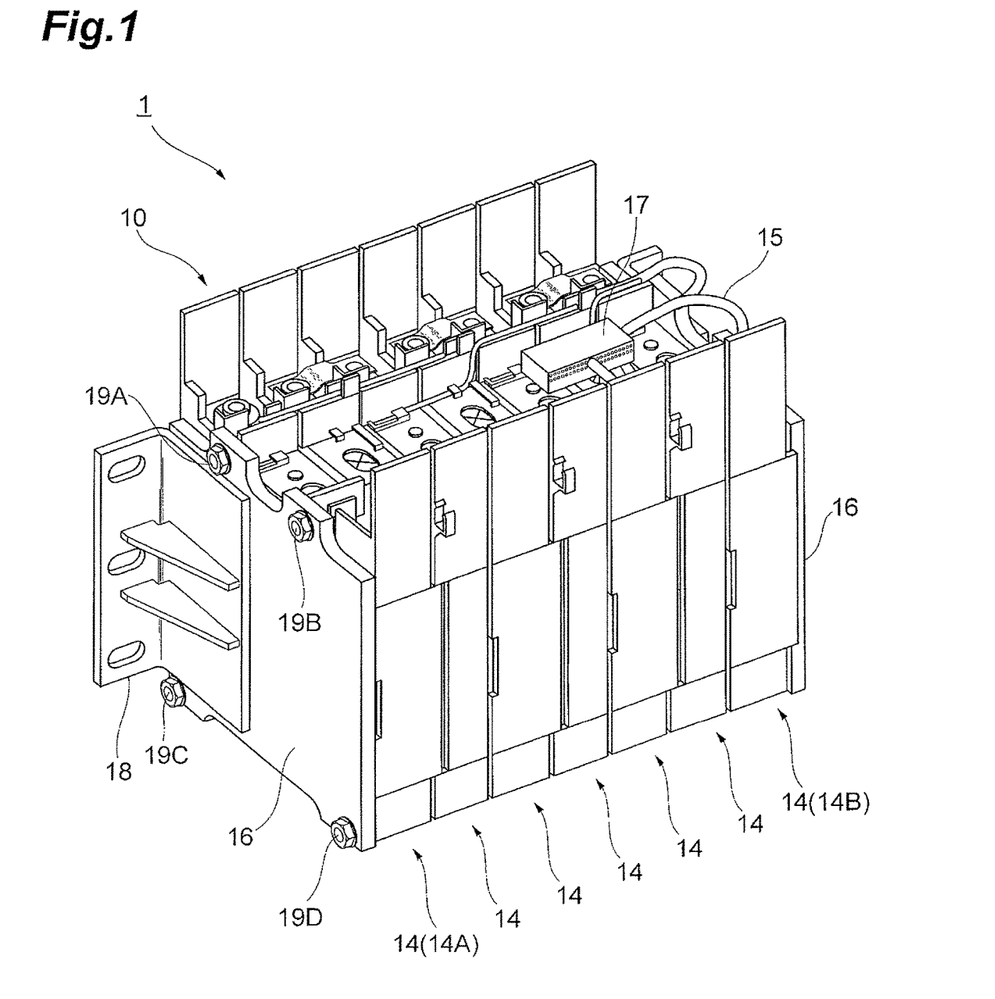
FIG. 1 shows a schematic perspective view illustrating a battery module unit of a power supply device according to an embodiment of the invention.

As illustrated in FIG. 1, the battery module unit 1 of the power supply device has a battery module 10. The battery module 10 includes a plurality of (seven in the figure) stacked battery units 14.

The battery module unit 1 of the power supply device further has a pair of end plates 16 at both ends in a stacking direction of the battery units 14 of the battery module 10. In addition, the plurality of battery units 14 is confined in the pair of end plates 16. For example, the pair of end plates 16 is fixed when four bolts 19A to 19D, which are inserted into one end plate 16 to extend toward the other end plate 16, are inserted into the respective battery units 14 and the other end plate 16 and screwed with nuts on a side of the other end plate 16. A fixed member 18 is fixed to each of the end plates 16. Each of the end plates 16 requires high rigidity, and thus is made of iron.

Figure 2:
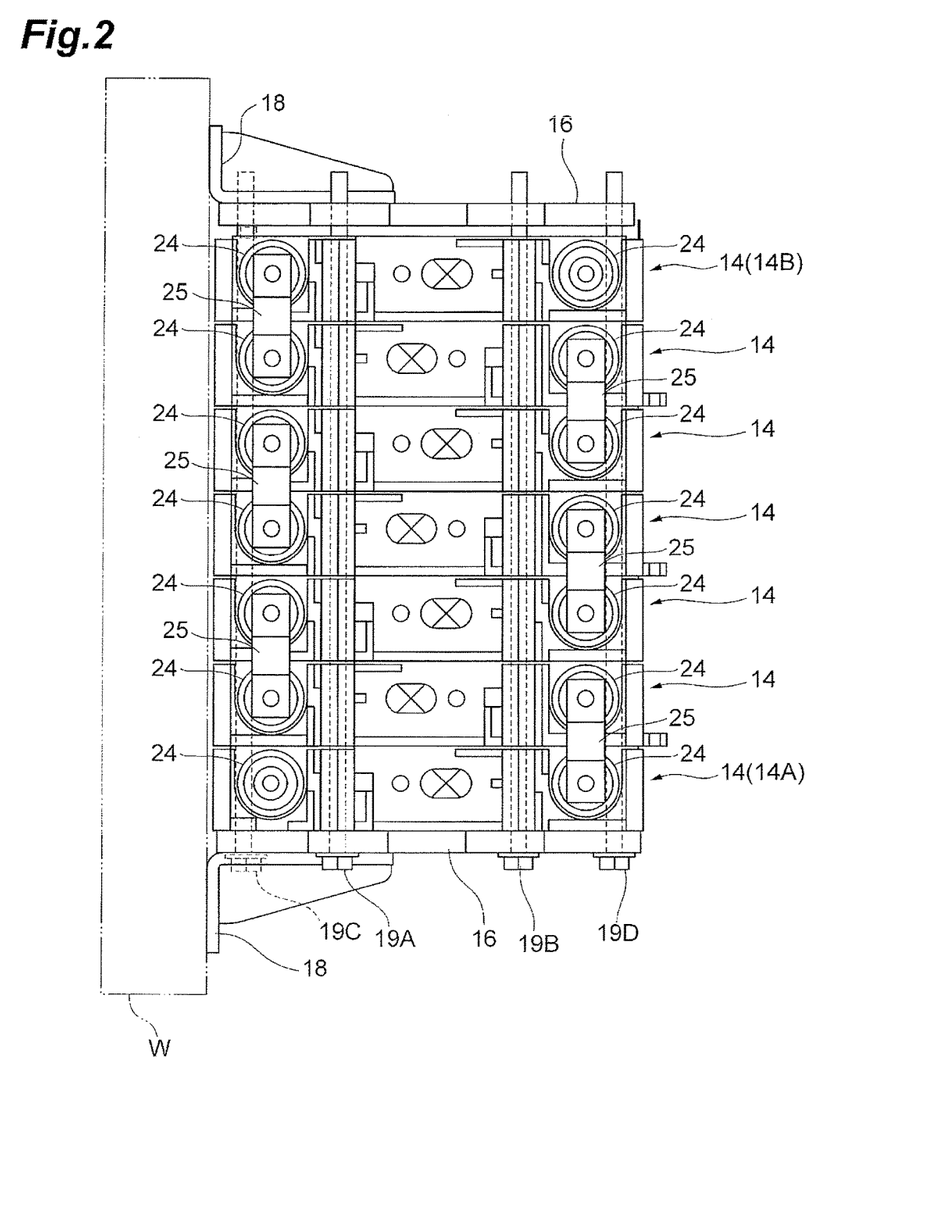
FIG. 2 shows a schematic plan view of the battery module unit of the power supply device of FIG. 1.

As illustrated in FIG. 2, the battery module 10 is fixed to a wall W that extends in a vertical direction such that the battery module 10 is cantilever-supported through the fixed member 18.

Figure 3:
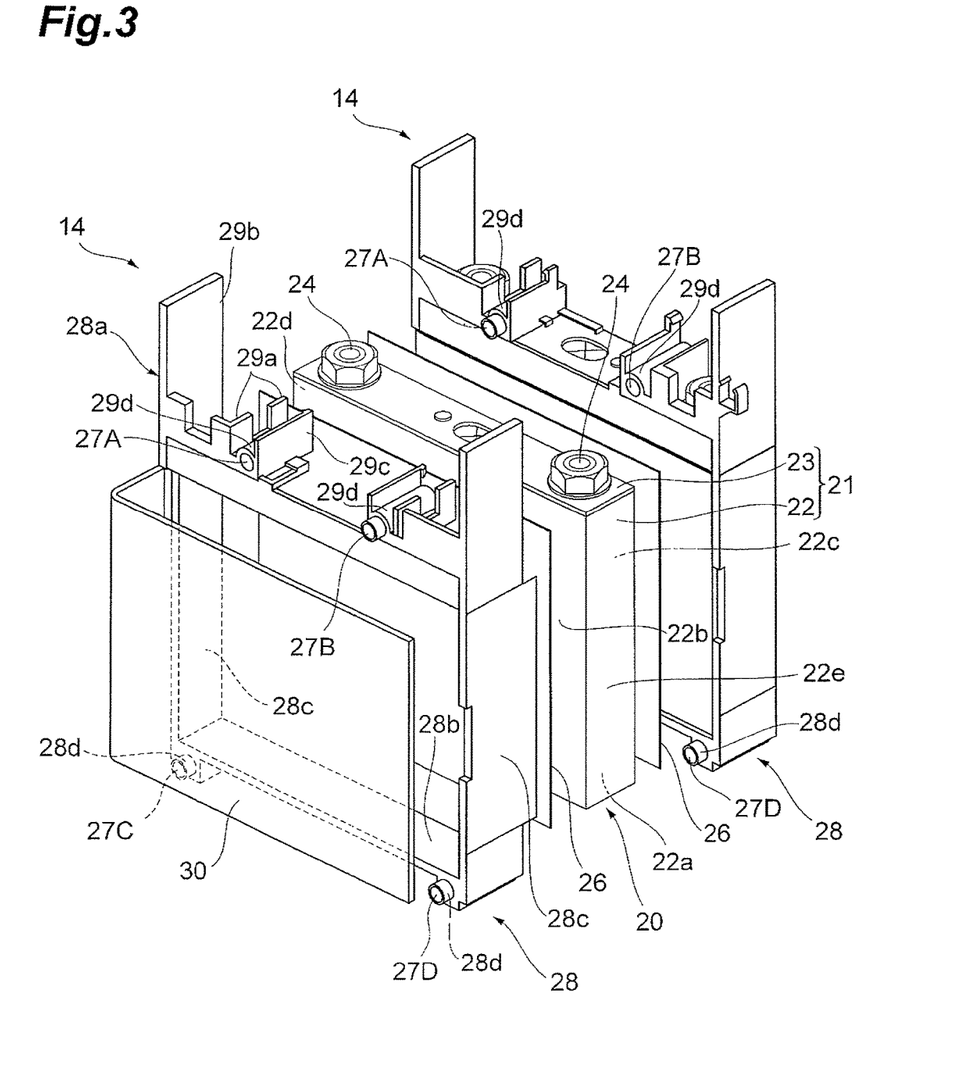
FIG. 3 shows an exploded perspective view of a battery unit.

As illustrated in FIG. 3, each of the battery units 14 has a battery cell 20, a resin holder 28, and a heat transfer plate 30.

The battery cell 20 has a case 21, an electrode assembly (not shown) accommodated inside the case 21, and a pair of terminals 24 joined to the electrode assembly, which is provided on the case 21. The case 21 is made of a conductive material (for example, aluminum), and has a bottomed and square tube-shaped main case portion 22 and a cover plate 23 that covers an opening of the main case portion 22. The main case portion 22 has a bottom plate 22a having a shape of a rectangular plate and four faces 22b to 22e vertically arranged from four sides of the bottom plate 22a. Hereinafter, among the four faces 22b to 22e, two faces that intersect with the stacking direction of the battery units 14 are referred to as a first face 22b and a second face 22c, and the other two faces are referred to as a third face 22d and a fourth face 22e for convenience of description.

The pair of terminals 24 is terminals for taking out power of the electrode assembly of the battery cell 20. In the present embodiment, as illustrated in FIG. 2, adjacent terminals 24 having different polarities are connected to each other through a bus bar 25 such that a plurality of battery cells 20 is connected in series.

As illustrated in FIG. 3, the resin holder 28 is a frame body integrally molded using resin, and has a wiring portion 28a disposed on the cover plate 23, a bottom face portion 28b that faces the bottom plate 22a of the main case portion 22, and a pair of vertically arranged portions 28c that faces the third face 22d and the fourth face 22e of the main case portion 22.

The wiring portion 28a has surrounding walls 29a vertically arranged to surround the respective terminals 24, a pair of external walls 29b extending upward in the vertical direction from the pair of vertically arranged portions 28c, partition walls 29c provided on the opposite side of the external walls 29b with respect to the surrounding walls 29a, and a pair of first bolt guide portions 29d provided between the surrounding walls 29a and the partition walls 29c.

The partition walls 29c extend in the staking direction of the battery units 14. The pair of first bolt guide portions 29d having guide holes 27A and 27B that guide the above-described bolts 19A and 19B is provided on sides of the terminals 24 in the partition walls 29c.

Further, in the resin holder 28, a pair of second bolt guide portions 28d having guide holes 27C and 27D that guide the above-described bolts 19C and 19D is provided at corner parts defined by the bottom face portion 28b and the respective pair of vertically arranged portions 28c.

The heat transfer plate 30 is an L-shaped metal plate disposed to cover the first face 22b and the third face 22d of the main case portion 22. For example, the heat transfer plate 30 is made of aluminum.

The heat transfer plate 30 can receive heat of the battery cell 20 in a portion that covers the first face 22b, and release heat to the wall W from a portion that covers the third face 22d.

The above-described resin holder 28 does not have portions that cover the first face 22b and the second face 22c of the main case portion 22, and thus the heat transfer plate 30 comes into contact with the first face 22b of the battery cell 20 held by the resin holder 28.

A double-sided adhesive tape (a second double-sided adhesive tape) 26 is attached to the whole first face 22b and the whole second face 22c of the battery cell 20 except for fringe regions thereof. For this reason, the heat transfer plate 30 adheres to the first face 22b of the battery cell 20 through the double-sided adhesive tape 26. As illustrated in FIG. 3, heat transfer plates 30 of adjacent battery units 14 are also present on a side of the second face 22c of the battery cell 20. Thus, each of the battery cells 20, except for battery cells 20 positioned at both sides in the stacking direction of the battery units 14, is sandwiched between a pair of heat transfer plates 30 through the double-sided adhesive tape 26.

Figure 4:
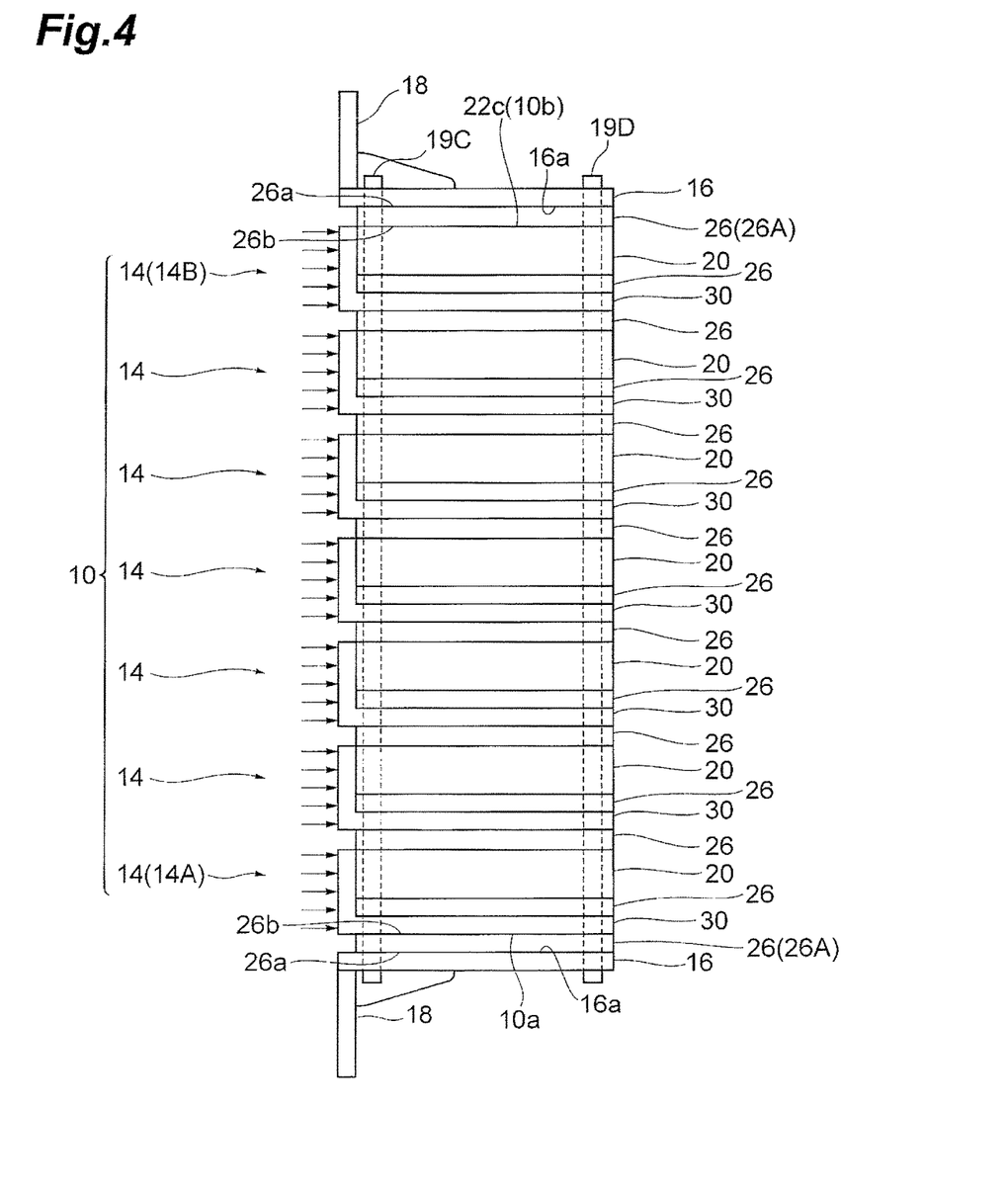
FIG. 4 shows a further schematized plan view of the plan view of FIG. 2.

As illustrated in FIG. 4, the battery module unit 1 further has a double-sided adhesive tape 26 disposed between the battery module 10 and each of the end plates 16. Specifically, the double-sided adhesive tape 26 is attached to a surface of a heat transfer plate 30 (hereinafter referred to as a first adhesive surface 10a) of a battery unit (hereinafter referred to as a battery unit 14A) positioned at one end in the stacking direction of the battery units 14 in the battery module 10. Further, the double-sided adhesive tape 26 is attached to a second face 22c of a case 21 of a battery cell 20 (hereinafter referred to as a second adhesive surface 10b) of a battery unit 14 (hereinafter referred to as a battery unit 14B) positioned at the other end in the stacking direction of the battery units 14 in the battery module 10. Hereinafter, the double-sided adhesive tape 26 positioned between the battery module 10 and the end plate 16 will be also referred to as an outermost tape (first double-sided adhesive tape) 26A for convenience of description.

In the outermost tape 26A of the present embedment, an adhesive force of a surface 26a attached to the end plate 16 is designed to be the same as an adhesive force of a surface 26b attached to the battery module 10 (the battery cell 20 and the heat transfer plate 30).

Meanwhile, as described in the foregoing, the end plates 16 are made of iron, and the case 21 of the battery cell 20 and the heat transfer plate 30 are made of aluminum. A surface roughness of iron is higher than a surface roughness of aluminum. Thus, a surface roughness of a surface of the end plate 16 to which the outermost tape 26A is attached (hereinafter referred to as an end plate adhesive surface 16a) is higher than a surface roughness of the first adhesive surface 10a and a surface roughness of the second adhesive surface 10b. An area of the end plate adhesive surface 16a, an area of the first adhesive surface 10a, and an area of the second adhesive surface 10b are identical to one another.

Herein, an adhesive strength J between the double-sided adhesive tape 26 and an adhesive member to which the double-sided adhesive tape 26 is attached is mainly obtained from parameters such as an adhesive force T of the double-sided adhesive tape 26, an area U of a surface of the adhesive member to which the double-sided adhesive tape 26 is attached, and a surface roughness V of the surface of the adhesive member to which the double-sided adhesive tape 26 is attached.

Therefore, for example, even when most parameter values among parameter values that determine the adhesive strength J between the double-sided adhesive tape 26 and the adhesive member to which the double-sided adhesive tape 26 is attached are unchanged, the adhesive strength J between the double-sided adhesive tape 26 and the adhesive member may change if only one parameter value is changed.

In addition, in the present embodiment, the surface roughness of the end plate adhesive surface 16a is different from the surface roughness of the first adhesive surface 10a and the surface roughness of the second adhesive surface 10b, and thus an adhesive strength J between the end plate 16 and the outermost tape 26A (hereinafter also referred to as an adhesive strength J1) is smaller than an adhesive strength J between the battery module 10 and the outermost tape 26A (hereinafter also referred to as an adhesive strength J2) (that is, J1<J2). In the present embodiment, all parameters that determine the adhesive strength J except for the surface roughness, for example, adhesive forces of both surfaces of the outermost tape 26A, the area of the end plate adhesive surface 16a, the area of the first adhesive surface 10a, the area of the second adhesive surface 10b, and the like, are unchanged.

An adhesive strength of the surface 26a on a side of the end plate 16 may be made smaller than an adhesive strength of the surface 26b on a side of the battery cell 20 or the heat transfer plate 30 by making compositions of adhesives of the both surfaces of the outermost tape 26A different from each other.

Then, when an adhesive strength between the end plate 16 and the outermost tape 26A is designed to be a minimum required strength at which the battery module 10 does not fall off, an operation of peeling off the end plate 16 from the battery module 10 is easily performed at the time of reworking.

Figure 5:
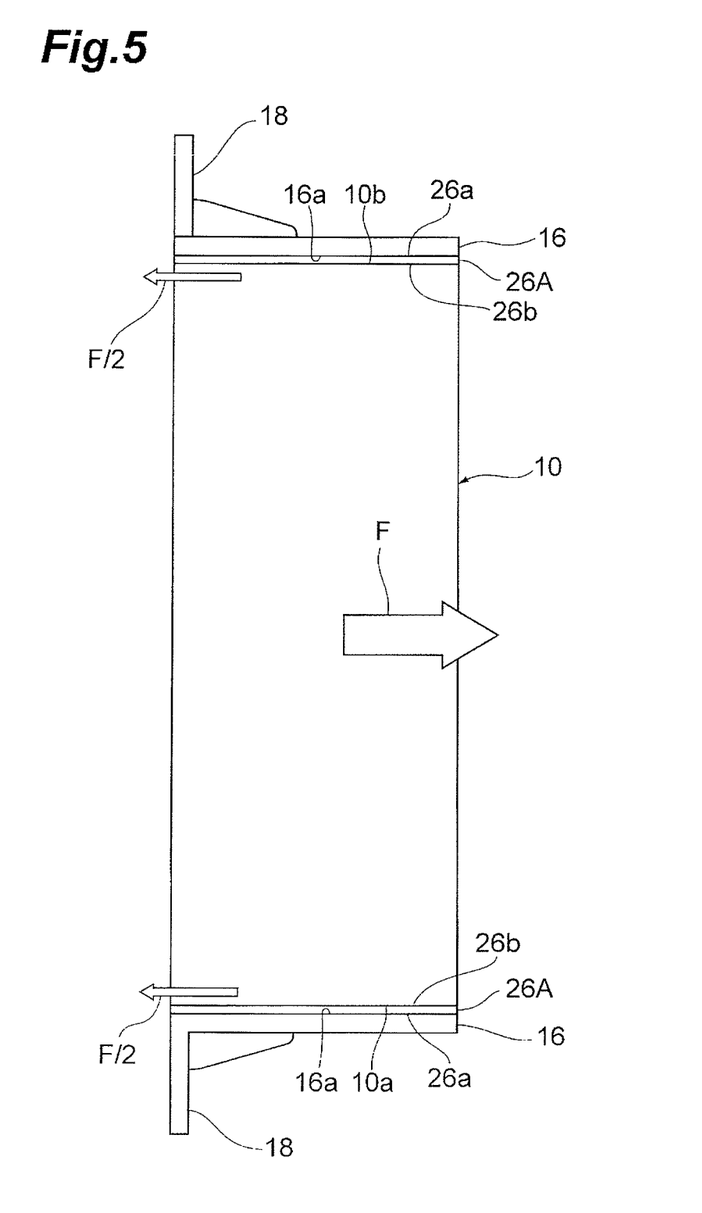
FIG. 5 shows a diagram illustrating a force applied to a battery module.

The above-mentioned minimum required strength can be obtained from a magnitude of a force illustrated in FIG. 5. Referring to FIG. 5, a vector of a symbol F indicates an inertial force applied to the battery module 10. This inertial force is the product of a weight M [kg] of the battery module 10, an impact G to be satisfied by the battery module 10 (an impact with respect to the battery module 10 at least satisfying a law or a regulation), and the acceleration of gravity 9.8 [m/s$^2$] (that is, F=M×G×9.8).

Therefore, each of the adhesive strength J1 between the end plate 16 and the outermost tape 26A and the adhesive strength J2 between the battery module 10 and the outermost tape 26A may have at least an adhesive strength that can withstand half the inertial force F. That is, when a formula of J1, J2≥F/2 is satisfied, the battery module 10 is held between the end plates 16 without falling off.

However, when a formula of J1, J2=F/2 is satisfied, there is concern that sufficient safety may not be ensured. Thus, a predetermined safety factor (about 1.5 to 2.0) may be multiplied. That is, the adhesive strength J1 between the end plate 16 and the outermost tape 26A and the adhesive strength J2 between the battery module 10 and the outermost tape 26A are designed to be greater than or equal to a magnitude of F/2 and around the magnitude of F/2.

Figure 6:
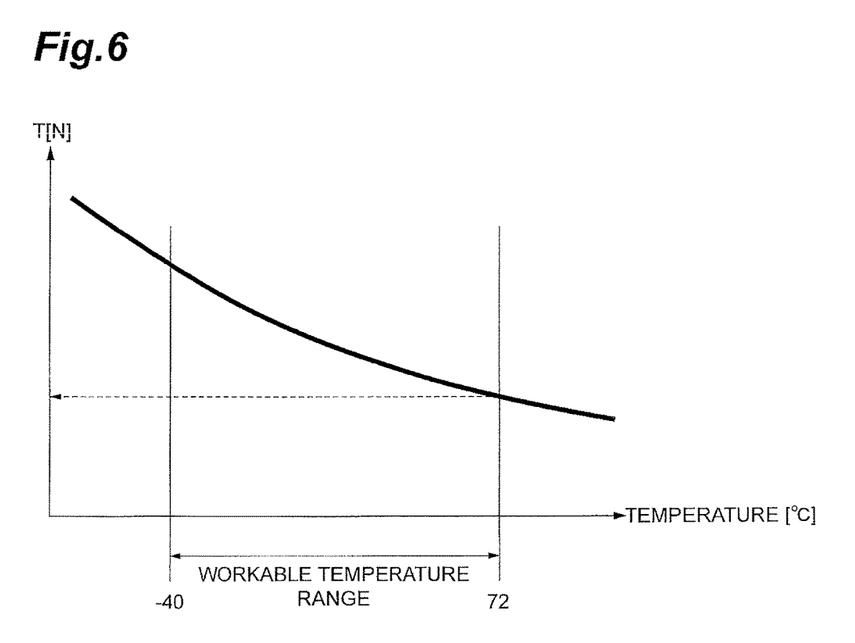
FIG. 6 shows a graph illustrating a relation between a temperature and an adhesive force of a double-sided adhesive tape.

In addition, as shown in a graph of FIG. 6, an adhesive force T of the outermost tape 26A varies in a working temperature range of the battery module 10 (−40° C. to 72° C., a temperature condition of a lithium ion battery regulated by United Nations Recommendations on the Transport of Dangerous Goods). That is, the adhesive force T of the outermost tape 26A monotonically decreases as a temperature increases, and the adhesive force becomes weakest at a maximum working temperature of 72° C.

For this reason, when the adhesive force of the outermost tape 26A is an adhesive force corresponding to the maximum working temperature of 72° C., the adhesive strength J1 between the end plate 16 and the outermost tape 26A and the adhesive strength J2 between the battery module 10 and the outermost tape 26A need to satisfy the formula of J1, J2≥F/2 such that the battery module 10 does not fall off in the working temperature range. The adhesive force of the outermost tape 26A may be designed to be around the magnitude of F/2.

As described in the foregoing, in the above-described battery module unit 1, a value of the adhesive strength J1 between the end plate 16 and the outermost tape 26A and a value of the adhesive strength J2 between the battery module 10 and the outermost tape 26A are designed to be greater than or equal to the minimum required strength for holding the battery module 10. For this reason, the battery module 10 does not fall off in a normally held state.

In addition, in the battery module unit 1, the value of the adhesive strength 11 between the end plate 16 and the outermost tape 26A is different from the value of the adhesive strength J2 between the battery module 10 and the outermost tape 26A. Specifically, the value of the adhesive strength J1 between the end plate 16 and the outermost tape 26A is smaller than the value of the adhesive strength J2 between the battery module 10 and the outermost tape 26A. For this reason, one of the battery module 10 and the end plate 16, which are attached to the outermost tape 26A and have values of the adhesive strengths J1 and J2 with respect to the outermost tape 26A, having a smaller adhesive strength (in the present embodiment, the end plate 16) can be easily peeled off from the outermost tape 26A at the time of reworking. As a result, workability in reworking is improved.

Further, in the battery module unit 1, the adhesive strength J1 corresponding to a smaller value between the value of the adhesive strength J1 between the end plate 16 and the outermost tape 26A and the value of the adhesive strength J2 between the battery module 10 and the outermost tape 26A is designed to be greater than or equal to the minimum required strength for holding the battery module 10 and around the minimum required strength. For this reason, the battery module 10 does not peel off in the normally held state, and the end plate 16 can be easily peeled off from the battery module 10 at the time of reworking.

The adhesive strength J1 between the end plate 16 and the outermost tape 26A may be made smaller than the adhesive strength J2 between the battery module and the outer host tape 26A by designing the adhesive forces of the both surfaces of the outermost tape 26A to be different from each other. In addition, the adhesive strength J1 between the end plate 16 and the outermost tape 26A may be made smaller than the adhesive strength J2 between the battery module and the outermost tape 26A by setting the area of the end plate adhesive surface 16a to be smaller than the area of the first adhesive surface 10a and the area of the second adhesive surface 10b. In other words, any one of the plurality of parameter values may be changed.

Furthermore, on the contrary to the above-described embodiment, the adhesive strength J1 between the end plate 16 and the outermost tape 26A may be made greater than the adhesive strength J2 between the battery module 10 and the outermost tape 26A (that is, J1>J2). In this case, the smaller adhesive strength J2 is designed to be greater than or equal to the minimum required strength for holding the battery module 10 and around the minimum required strength.

In addition, the outermost tape 26A may be configured using the same type of tape having the same adhesive property as the double-sided adhesive tape 26 disposed on both surfaces of the battery cell 20 in a direction that intersects with the stacking direction of the battery units 14. In this case, the surface roughness of the end plate adhesive surface 16a may be higher than the surface roughness of the first adhesive surface 10a and the surface roughness of the second adhesive surface 10b. In this case, a separate tape may not be prepared, and simplicity may be attempted when procuring parts.

Further, the outermost tape 26A and the double-sided adhesive tape 26, which is disposed on the both surfaces of the battery cell 20 in the direction that intersects with the stacking direction of the battery units 14, may be set to different types of tapes having different adhesive properties.

In addition, the battery unit 14 may have at least the battery cell 20, and may not have the heat transfer plate 30 or the resin holder 28.

REFERENCE SIGNS LIST

1: battery module unit
10: battery module
16: end plate
14: battery unit
26, 26A: double-sided adhesive tape
20: battery cell
30: heat transfer plate

What is claimed is:

1. A battery module unit comprising:
a battery module having a plurality of stacked battery units each including a battery cell;
a pair of end plates holding the battery module from both end sides in a stacking direction of the battery units; and
a first double-sided adhesive tape disposed between the battery module and each of the pair of end plates,
the first double-sided adhesive tape being configured such that an adhesive strength between the first double-sided adhesive tape and the end plates is greater than or equal to half an inertial force applied to the battery module, and an adhesive strength between the first double-sided adhesive tape and the battery module is greater than or equal to half the inertial force applied to the battery module such that a value of the adhesive strength between the first double-sided adhesive tape and the end plates is smaller than a value of the adhesive strength between the first double-sided adhesive tape and the battery module.

2. A battery module unit comprising:
a battery module having a plurality of stacked battery units each including a battery cell;
a pair of end plates holding the battery module from both end sides in a stacking direction of the battery units; and
a first double-sided adhesive tape disposed between the battery module and each of the pair of end plates, the first double-sided adhesive tape being configured such that an adhesive strength between the first double-sided adhesive tape and the end plates and an adhesive strength between the first double-sided adhesive tape and the battery module are greater than or equal to half an inertial force applied to the battery module and around half the inertial force such that a value of the adhesive strength between the first double-sided adhesive tape and the end plates is smaller than a value of the adhesive strength between the first double-sided adhesive tape and the battery module.

3. The battery module unit according to claim 1, further comprising:
a second double-sided adhesive tape disposed between respective adjacent battery units, wherein
the second double-sided adhesive tape and the first double-sided adhesive tape are configured using the same type of tape having a same adhesive property.

4. The battery module unit according to claim 2, further comprising:
a second double-sided adhesive tape disposed between respective adjacent battery units, wherein
the second double-sided adhesive tape and the first double-sided adhesive tape are configured using the same type of tape having a same adhesive property.

5. The battery module unit according to claim 1, wherein the inertial force is applied to the battery module in a direction perpendicular to a stacking direction of the stacked battery units.

6. The battery module unit according to claim 2, wherein the inertial force is applied to the battery module in a direction perpendicular to a stacking direction of the stacked battery units.

7. The battery module unit according to claim 1, wherein the first double-sided adhesive tape includes a first surface and a second surface opposite of the first surface, and an adhesive force of the first surface is smaller than an adhesive force of the second surface.

8. The battery module unit according to claim 2, wherein the first double-sided adhesive tape includes a first surface and a second surface opposite of the first surface, and an adhesive force of the first surface is smaller than an adhesive force of the second surface.

* * * * *